US010275258B2

(12) United States Patent
Zellermayer et al.

(10) Patent No.: US 10,275,258 B2
(45) Date of Patent: Apr. 30, 2019

(54) SYSTEMS AND METHODS FOR ENHANCING THE AVAILABILITY OF MULTI-TIER APPLICATIONS ON CLOUD COMPUTING PLATFORMS

(71) Applicant: VMware, Inc., Palo Alto, CA (US)

(72) Inventors: Gal Zellermayer, Ramat Hasharon (IL); Moran Shimron, Mevaseret Zion (IL); Avshi Avital, Sde Warburg (IL); Hilik Paz, Ramat Gan (IL)

(73) Assignee: VMware, Inc., Palo Alto, CA (US)

( * ) Notice: Subject to any disclaimer, the term of this patent is extended or adjusted under 35 U.S.C. 154(b) by 937 days.

(21) Appl. No.: 14/319,273

(22) Filed: Jun. 30, 2014

(65) Prior Publication Data

US 2015/0378743 A1    Dec. 31, 2015

(51) Int. Cl.
*G06F 9/50* (2006.01)
*G06F 11/14* (2006.01)
(Continued)

(52) U.S. Cl.
CPC ........ *G06F 9/4401* (2013.01); *G06F 9/45558* (2013.01); *G06F 9/50* (2013.01); *G06F 11/14* (2013.01); *G06F 2009/45591* (2013.01)

(58) Field of Classification Search
CPC .................. G06F 11/00; G06F 11/008; G06F 2009/45591; G06F 9/45558; G06F 11/07; G06F 9/4407; G06F 9/50; G06F 11/14
(Continued)

(56) References Cited

U.S. PATENT DOCUMENTS 8,621,260 B1 * 12/2013 Sontakke ............ G06F 11/1438
714/3
8,935,563 B1 * 1/2015 Rajaa .................. G06F 11/0709
714/4.11
(Continued)

OTHER PUBLICATIONS

Blaback, "SA B08: Managing Multi-Tier Application Availability and Orchestration with Virtual Business Services," Nov. 30, 2012, 32 pages, Symantec Corporation.
(Continued)

*Primary Examiner* — Daniel C. Murray
*Assistant Examiner* — Adam A Cooney
(74) *Attorney, Agent, or Firm* — Hanley, Flight & Zimmerman, LLC

(57) ABSTRACT

Systems and methods for enhancing the availability of multi-tier applications on cloud computing platforms are disclosed. An example method comprises identifying, using a processor, dependencies among application components in a multi-tier application; generating, using the processor, an application blueprint defining the multi-tier application based on the identified dependencies; generating a remediation policy based on the identified dependencies in the application blueprint, the remediation policy comprising instructions to restore availability of the multi-tier application; detecting unavailability of the multi-tier application; identifying, using the processor, one of the application components as being responsible for the unavailability of the multi-tier application; and restarting, using the processor, the identified one of the application components based on the remediation policy to restore availability of the multi-tier application.

24 Claims, 10 Drawing Sheets

(51) Int. Cl.
*G06F 9/455* (2018.01)
*G06F 9/4401* (2018.01)

(58) Field of Classification Search
USPC .......................................... 709/223
See application file for complete search history.

(56) References Cited

U.S. PATENT DOCUMENTS

| | | | |
|---|---|---|---|
| 8,966,318 B1* | 2/2015 | Shah ................... | G06F 11/3664 714/28 |
| 2011/0202795 A1* | 8/2011 | Marathe .............. | G06F 11/1438 714/23 |
| 2013/0042139 A1* | 2/2013 | Bhalerao ............. | G06F 11/0793 714/2 |
| 2013/0232463 A1 | 9/2013 | Nagaraja et al. | |
| 2015/0277949 A1* | 10/2015 | Loh ..................... | G06F 9/45558 711/152 |

OTHER PUBLICATIONS

"High Availability 5.0 Deployment Best Practices," Jan. 2013, 20 pages, Technical Marketing Documentation, VMware.

* cited by examiner

SYSTEMS AND METHODS FOR ENHANCING THE AVAILABILITY OF MULTI-TIER APPLICATIONS ON CLOUD COMPUTING PLATFORMS

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than in the past.

Administrators may define critical applications, which are considered to be very important to the users. From the administrator's perspective, down time of critical applications should be minimized. However, making a multi-tier application highly available (e.g., having down time less than a specified threshold) is challenging due to the complexity of multi-tier applications.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
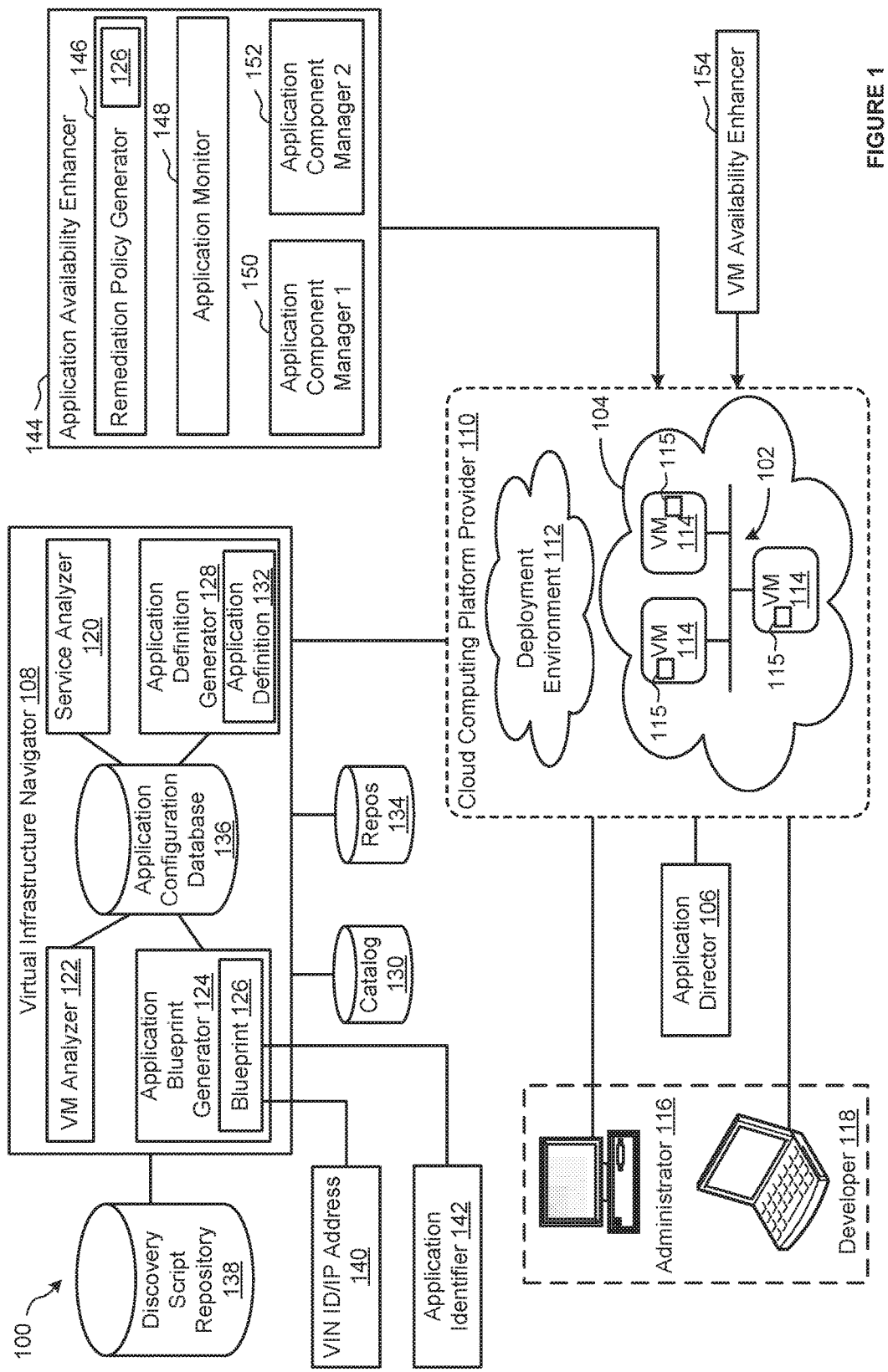
FIG. 1 depicts an example system constructed in accordance with the teachings of this disclosure to generate remediation policies for enhancing the availability of a multi-tier application.

As used herein, the term "application component" refers to code (e.g., custom code) that has been packaged according to a format (e.g., as an archive format such as an enterprise archive (e.g., .ear file), a web archive (e.g., .war file), etc.).

As used herein, the term "node" or "logical node" refers to a virtual machine (VM) or a cluster of VMs defined in a blueprint.

As used herein, the term "blueprint" refers to a logical topology of an application for deployment. A blueprint captures the structure of an application with logical nodes, their corresponding services and operating systems, dependencies, default configurations, and network topology requirements.

As used herein, "services" refer to scripted software that provide a software infrastructure for an application. Services may be reused in multiple applications. Examples of services include application servers (e.g., Rails, Apache Tomcat, JBoss), database servers (e.g., GemFire, MySQL, SQLFire, MongoDB, Postgres), monitoring services (e.g., Hyperic, SpringInsight), web servers (e.g., Apache, VMware vFabric Enterprise Ready Server), messaging services (e.g., RabbitMQ), and other middleware services.

As used herein, the term "cloud provider" refers to a cloud instance for deployment of applications or services.

As used herein, the term "deployment environment" refers to an environment (e.g., an overall structure within which a user, computer, or program operates) in a cloud provider. A deployment environment may be used, for example, for development, testing, staging, and/or production. A cloud provider can have multiple deployment environments.

As used herein, the term "service" refers to scripted software that can be installed on a VM and may be reused in multiple applications.

As used herein, the term "properties" refers to configuration variables used by scripts to set parameters on a script and run various configurations. For example, setting an installation_path property value causes installation scripts to use the property to specify the path to use to install a service during an application deployment process.

As used herein, the term "application" generally refers to a logical deployment unit, comprised of application packages and their dependent middleware and operating systems. Applications may be distributed across multiple VMs.

As used herein, the term "multi-tier application" refers to an application in which different functions of the application are logically separated (e.g., using different VMs and/or VM clusters) to handle different tasks or functions of the application.

As used herein, the term "availability" refers to the ability of a multi-tier application to be accessed or used by a user to perform the functions of the multi-tier application, which may include receiving requests, processing information in the requests, and providing responses.

Example systems and methods disclosed herein overcome challenges in making multi-tier applications highly available by automatically (e.g., using a computer) defining one or more remediation policies for a multi-tier application, automatically detecting down time, and/or automatically implementing or applying the remediation policy to restore availability of the multi-tier application. Solutions disclosed herein overcome problems associated with providing services using complex multi-tier applications in a manner that is advantageous and cost-effective relative to using manual monitoring and remediation of such applications.

In some examples disclosed herein, a virtual infrastructure navigator discovers dependencies of a multi-tier application by exploring the application and/or a blueprint representing the application. As discussed in more detail below, the dependencies often affect the order of deployment, execution, start order, configuration, and/or recovery of some or all of the components that collectively provide the multi-tier application. Using the discovered dependencies, examples disclosed herein create remediation policies to restore availability in the event of a failure by one or more components of the multi-tier application. The example remediation policies include instructions to install application component(s), start application component(s), execute commands using the application component(s), configure application component(s), and/or reset application component(s) (e.g., failed application components and any other application component(s) that need to be reset based on the discovered dependencies). By discovering the dependencies of the application components and generating remediation policies, example systems and methods disclosed herein expand the protections offered by "high availability" services to add protection for failures occurring in middleware (in addition to infrastructure services such as VMs and/or hardware that were previously protected).

Example methods disclosed herein include identifying dependencies among application components in a multi-tier application; generating an application blueprint defining the multi-tier application based on the identified dependencies; generating a remediation policy based on the identified dependencies in the application blueprint, the remediation policy comprising instructions to restore availability of the multi-tier application; detecting unavailability of the multi-tier application; identifying one of the application components as being responsible for the unavailability of the multi-tier application; and restarting the identified one of the application components based on the remediation policy to restore availability of the multi-tier application.

Example apparatus disclosed herein include an infrastructure navigator and an availability enhancer. The infrastructure navigator identifies dependencies between application components in an application blueprint defining a multi-tier application. The availability enhancer generates a remediation policy based on the identified dependencies, detect unavailability of the multi-tier application, identify one of the application components as being responsible for the unavailability of the multi-tier application, and restart the identified one of the application components based on the remediation policy to make the multi-tier application available, the remediation policy comprising instructions to restore availability of the multi-tier application.

FIG. 1 depicts an example system 100 constructed in accordance with the teachings of this disclosure to generate remediation policies for enhancing the availability of a multi-tier application 102. In the example of FIG. 1, the multi-tier application 102 is a customized multi-tier application (e.g., an application modified from component templates) that may be initially deployed in a deployment environment 112 in a managed or unmanaged state (e.g., managed, or not managed via an application lifecycle package). The example system 100 includes an example virtual infrastructure navigator 108, which may be used to discover the configuration (e.g., customized characteristics) of the multi-tier application 102 and/or to convert a customized application from an unmanaged state to a managed state.

As shown in FIG. 1, the example multi-tier application 102 is deployed in the deployment environment 104 provided by a cloud computing platform provider 110 (also referred to herein simply as a "cloud provider"). The example cloud computing platform provider 110 of FIG. 1 may include any number of deployment environments 104, 112.

The example multi-tier application 102 of FIG. 1 includes multiple VMs 114. The example VMs 114 of FIG. 1 provide different functions within the multi-tier application 102 (e.g., services, portions or components of the multi-tier application 102, etc.). The example VMs 114 are provided with agents 115 that have access to the configuration information and may execute instructions in the VMs 114. For example, the agents 115 may be provided with root access or administrator-level access to the VMs 114. Examples disclosed herein may request information from the VMs 114 (e.g., to develop a remediation policy) and/or instruct the VMs 114 to execute instructions via the respective agents 115 (e.g., to implement or execute a remediation policy).

One or more of the VMs 114 of the illustrated example are customized by an administrator 116 and/or a developer 118 of the multi-tier application 102 relative to a stock or out-of-the-box version of the services and/or application components (e.g., component templates, services available from a catalog, etc.). Additionally, as discussed below, at least a of the portion services executing on the example VMs 114 of the multi-tier application 102 have dependencies on other ones of the VMs 114 in the multi-tier application 102. Examples of dependencies include: 1) a data processing component, which is dependent on a database component, requesting and receiving data used for calculations from the database component; and/or 2) a networking component, which is dependent on another component, relying on dynamic network interface characteristics of the other component to be networked to configure a networking function for the other component.

As illustrated in FIG. 1, the example cloud computing platform provider 110 provides multiple deployment environments 104, 112 (e.g., for development, testing, staging, and/or production of applications). The administrator 116 and/or the developer 118 may access services from the cloud computing platform provider 110, for example, via REST (Representational State Transfer) APIs (Application Programming Interface) and/or via any other client-server communication protocol. One particular implementation of a REST API for cloud computing services is vCloud Director API available from VMware, Inc. The example cloud computing platform provider 110 provisions virtual computing resources (e.g., the VMs 114) and/or physical resources to provide the deployment environments 104, 112 in which the administrator 116 and/or developer 118 can deploy multi-tier application(s). One particular example of a deployment environment that may be used to implement the deployment environments 112 of FIG. 1 is vCloud DataCenter cloud computing services available from VMware, Inc.

A blueprint 126 generally captures the structure of an application as a collection of application components executing on virtual computing resources. For example, the blueprint 126 generated by the example application blueprint generator 124 for an online store application may specify a web application (e.g., in the form of a Java web application archive or "WAR" file comprising dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store.

The example virtual infrastructure navigator 108 of FIG. 1 discovers the configurations of the application components of the multi-tier application 102, which are used to generate remediation policies. In some examples, the virtual infrastructure navigator 108 generates the example application blueprint 126 based on the deployed multi-tier application 102, which may be imported to an application director 106 to be deployed and/or managed. To generate the application blueprint 126, the example virtual infrastructure navigator 108 of FIG. 1 includes an example service analyzer 120, an example VM analyzer 122, an example application blueprint generator 124, an example application definition generator 128, and an example application configuration database 136. The example virtual infrastructure navigator 108 of FIG. 1 is in communication with an example discovery script repository 138. All or part of the example virtual infrastructure navigator 108 of FIG. 1 may be implemented using vCenter™ Infrastructure Navigator™ available from VMware, Inc.

The example service analyzer 120 of FIG. 1 identifies the VMs 114 that are within an application definition 132. In some examples, the service analyzer 120 analyzes an application service package to identify the VMs 114 (e.g., VM name, VM IP address, VM host resource(s), etc.). In some other examples, the application definition generator 128 generates the application definition based on scans of the VMs 114 by the service analyzer 120 based on a seed VM 114, a VM identifier (e.g., a VIN ID) and/or an IP address 140 of a currently-running VM 114, and/or an application identifier 142 for the multi-tier application 102, such as a unique application name and an identifier of the deployment environment 104 in which the multi-tier application 102 is deployed.

The example application definition generator 128 of the example virtual infrastructure navigator 108 generates an application definition 132 based on the configurations and/or properties resulting from the configurations of the VMs 114 (e.g., the middleware executing on the VMs 114). The application definition 132 includes a set of identifiers of the VMs 114 implementing the multi-tier application 102.

The example VM analyzer 122 of the example virtual infrastructure navigator 108 of FIG. 1 identifies customized configurations (e.g., configuration items) for the identified VMs 114 implementing the multi-tier application 102. For example, the VM analyzer 122 selects, for analysis, the VMs 114 that were identified by the service analyzer 120, defined in the application definition 132, and/or stored in the application configuration database 136. To analyze the example VMs 114, the example VM analyzer 122 of FIG. 1 selects and/or accesses discovery script(s) stored in the discovery script repository 138.

In the illustrated example, discovery scripts execute on the VM analyzer 122 and/or on the VMs 114 (e.g., using administrator credentials for the VMs 114) to discover configuration items of the VMs 114. For example, the VM analyzer 122 of FIG. 1 may execute the discovery script(s) to access the VM 114 via an interface (e.g., a command and/or text-based interface), through which the VM analyzer 122 may request and receive access to data elements (e.g., configuration items) of the VM 114. In some other examples, the VM analyzer 122 may transfer the discovery script(s) to the VM 114 for execution. The VM analyzer 122 of the illustrated example receives the configurations (e.g., configuration item information) from the VM 114 (e.g., from communications by the executing discovery script(s)). The example VM analyzer 122 of FIG. 1 stores discovered configuration items in the application configuration database 136. In some examples, the VM analyzer 122 requests and/or executes a first discovery script in the discovery script repository 138, which results in calling additional discovery scripts based on the discovered configurations of the VMs 114.

In the example of FIG. 1, the VM analyzer 122 stores the discovered properties and configurations (e.g., configuration item information) in association with data for respective ones of the VMs 114 such that the VMs 114 can be deployed by the application director 106 with the same respective configurations and/or properties to deploy a functionally identical version of the multi-tier application 102 in each of the deployment environments 104, 112.

In some examples, the discovery script(s) used by the service analyzer 120 to analyze and determine the application definition 132 are different than discovery script(s) used by the VM analyzer 122 to determine configurations of the VMs 114 for generating the application blueprint 126. For example, the service analyzer 120 calls a first discovery script to determine the application definition based on identification of a seed VM 114, and the VM analyzer 122 calls a second discovery script to obtain the configurations of the VMs 114 when the application definition 132 is generated (e.g., via running the first discovery script) and/or when the application definition is determined from an application service package (e.g., a WAR file).

The example application blueprint generator 124 of FIG. 1 generates the application blueprint 126 based on the identified configurations of the VMs 114 implementing the multi-tier application 102. The application blueprint generator 124 of FIG. 1 converts or translates the configuration items (e.g., configurable data elements in the VMs 114) to properties (e.g., variables to be used by scripts to set parameters on a script and run various configurations during deployment) for inclusion in the application blueprint 126.

In the example of FIG. 1, the example VM analyzer 122 identifies any customized configuration elements of the VMs 114. Example configuration elements that may be discovered by the VM analyzer 122 (e.g., via the discovery scripts) and may be implemented in the blueprint 126 include: dependencies between the VMs 114, services, and/or other application components in the multi-tier application 102; node cluster definitions; load balancing information; port configurations; ciphers; custom drivers; and/or limits on simultaneous executing threads. However, the example VM analyzer 122 may execute the discovery scripts to discover any other customized application configuration elements. When the application blueprint generator 124 of the illustrated example has processed each of the VMs 114 (e.g., the VMs 114 analyzed by the VM analyzer 122) and applied the appropriate configuration items to the application blueprint 126, the example application blueprint 126 of FIG. 1 will have been generated to be representative of the customized multi-tier application 102 of FIG. 1. The application blueprint 126 includes the configurations of the VMs 114 and may be deployed by the application director 106 to a deployment environment 112 as a managed application.

The example blueprint 126 of FIG. 1 may be assembled from items (e.g., templates) from a catalog 130. The catalog 130 is a listing of available virtual computing resources (e.g., VMs, networking, storage) that may be provisioned from the cloud computing platform provider 110. The example catalog 130 may further include available application components (e.g., software services, scripts, code components, application-specific packages) that may be installed on the provisioned virtual computing resources. The example catalog 130 may be pre-populated and/or customized by an administrator 116 (e.g., IT or system administrator) that inputs specifications, configurations, properties, and/or other details about items in the catalog 130.

Based on the multi-tier application 102, the example blueprints 126 may define one or more dependencies between application components to indicate an installation order of the application components during deployment. For example, since a load balancer usually cannot be configured until a web application is up and running, the VM analyzer 122 may discover, and/or the developer 118 may specify, a dependency from an Apache web application service to an application code package.

As mentioned above, the example multi-tier application 102 may have one or more dependencies between application components. A dependency reflects a relationship between the application components that defines an interconnected structure of distributed portions of the multi-tier application 102 (e.g., multiple tiers of the multi-tier application 102). The dependencies may include, for example, input data and/or confirmation of performance of another task prior to execution of a task by a service. Execution of discovery scripts by the VM analyzer 122 of the example virtual infrastructure navigator 108 may reveal dependencies based on, for example, open communication ports, public APIs, network adapter configuration information, active network connections, and/or other configuration information and/or combinations of configuration elements.

Dependencies may be used to plan deployment of the multi-tier application 102 by defining a deployment order for application components (e.g., that indicates whether deployment tasks for one item will wait to run until the tasks for another item has finished). For example, because a load balancer usually cannot be configured until an associated web application is up and running, there is a dependency of a load balancer (e.g., Apache) on a web application package (e.g., EAR component) to indicate that the load balancer should be deployed after the deployment of the web application is completed.

The example application availability enhancer 144 of FIG. 1 enhances (e.g., increases, maximizes) the availability of the multi-tier application 102 to reduce the time that the multi-tier application 102 is unavailable due to, for example, failures or errors by services or middleware executing on the VMs 114. To enhance the availability of the multi-tier application 102, the example application availability enhancer 144 generates remediation policies to make the multi-tier application 102 available when an unavailability is detected, monitors the multi-tier application 102 to rapidly detect unavailability and, when, an unavailability is detected invokes one or more remediation policies based on the cause of the unavailability.

To generate remediation policies for the example multi-tier application 102, the example application availability enhancer 144 includes a remediation policy generator 146. The example remediation policy generator 146 of FIG. 1 obtains the application blueprint 126 from the example virtual infrastructure navigator 108, including the dependencies between components of the multi-tier application 102 that were identified by the virtual infrastructure navigator 108. Based on the dependencies in the application blueprint 126, the example remediation policy generator 146 generates remediation policies that specify an order in which the application components are to be restarted in the event of unavailability. In some examples, the remediation policy generator 146 generates a separate remediation policy for each potential point of failure (e.g., for each application component). The use of different policies enables the remediation policy that is most appropriate for a particular failure to be selected and, thus, reduces or eliminates unnecessary actions for restoring availability. For example, if a first service in the multi-tier application 102 is not dependent on any services that must be restarted to restore availability of the multi-tier application 102, and is not itself the cause of the unavailability, a remediation policy to restore availability of the multi-tier application 102 need not include instructions to reset the first service. As a result, such a remediation policy saves time over remediation policies that reset components unnecessarily.

To generate a remediation policy for a given application component (e.g., when that application component is the source of the failure), the example remediation policy generator 146 identifies a second set of application component(s) which are dependent on the application component that has failed. If applicable, the remediation policy generator 146 further identifies additional application component(s) which are dependent on the dependent application component(s) (e.g., directly and/or indirectly dependent). The remediation policy generator 146 identifies the dependent application component(s) using, for example, inter-dependencies between the application component(s) as specified in the application blueprint 126. For each of the failed application component and/or the identified dependent application component(s), the example remediation policy generator 146 determines one or more application component manager(s) 150, 152 to be used to communicate with the application component(s) (e.g., based on the API or other communication requirements of the application component(s)).

The example remediation policy generator 146 generates instructions to make each of the identified application components available. For example, the remediation policy generator 146 generates instructions to be transmitted to the failed application component to restart the failed application component. The remediation policy generator 146 further generates respective instructions to be transmitted to the dependent application component(s) to restart the dependent application component(s). In some examples, the remediation policy generator 146 also generates alternate instructions to re-deploy any or all of the failed application component and/or the dependent application component(s). The alternate instructions are included in the remediation policy and may be used when the failed application component cannot simply be restarted due to, for example, an underlying hardware or network problem. Alternate instructions may additionally or alternatively include any other remediation actions, such as escalating the unavailability to the administrator 116 for manual remediation.

Instructions to restart an application component may include, for example, instructions to a hypervisor to restart a VM; instructions to apply a particular state (e.g., disk image) to a VM; instructions to a VM and/or an agent executing on the VM to restart an operating system; instructions to a VM, to an operating system on the VM, and/or to an agent executing on the VM to restart a service, an application, and/or other software or middleware associated with the application component; and/or any other appropriate instructions for making the application component operational and available for use in the multi-tier application 102.

The example application availability enhancer 144 of FIG. 1 includes an application monitor 148 to monitor the status of components of the multi-tier application 102 operating in the deployment environment(s) 112 on the VMs 114. The application monitor 148 may request and/or receive heartbeat messages and/or test/result messages to verify the availability of the middleware and/or applications on the VM 114.

In the example of FIG. 1, the application availability enhancer 144 includes application component managers 150, 152 to interface with different types of application components. For example, the first application component manager 150 may include a set of interfaces for communicating with a first type of application component, such as a database application component type, a particular type of operating system, a particular type of VM, etc. For example, the application component, operating system, VM 114, and/or agent 115 executing on the VM 114 may expose one or more APIs for providing commands to the application component, and the first application component manager 150 is configured to access the application component, operating system, VM 114, and/or agent 115 executing on the VM 114 using the exposed API(s). Similarly, the example second application component manager 152 of FIG. 1 may include a separate set of interfaces for communicating with a second type of application component, such as a business intelligence application component type, a second type of operating system, a second type of VM, etc. For example, the application component, operating system, VM 114, and/or agent 115 executing on the VM 114 may expose one or more APIs (e.g., different APIs than the first component type) for providing commands to the application component, and the second application component manager 152 is configured to access the application component, operating system, VM 114, and/or agent 115 executing on the VM 114 using the different exposed API(s). The example application availability enhancer 144 may include any number of application component managers 150, 152 for interfacing with a corresponding number of application component types.

The example application monitor 148 monitors the example deployment environment 112, the VMs 114, and/or the software components operating on the VMs 114 to determine whether the multi-tier application 102 is available and/or operating properly. For example, the application monitor 148 may issue pings or other types of requests to the application components and compare responses received from the application components to expected responses. However, any other method of detecting malfunction or unavailability may be used.

When the application monitor 148 identifies an unavailability (e.g., by failing to receive a response from one or more application components, by receiving an incorrect response from one of the application components, etc.), the application availability enhancer 144 determines one or more components of the multi-tier application 102 that are responsible for (e.g., that caused) the unavailability. For example, the application monitor 148 (e.g., and/or the application component manager(s) 150, 152) may identify which application component(s) have not responded and/or have incorrectly responded to monitoring messages and/or diagnostic messages sent to the application components (e.g., the VMs 114 and/or the software executing on the VMs 114). If an application component does not respond properly, the application availability enhancer 144 determines that the application component is a candidate for being responsible for the unavailability. If there are multiple candidate application components, the example application monitor 148 may determine that multiple application components are responsible, or may determine that one application component is responsible based on dependencies between the candidate application components in the application blueprint 126.

In an example, if a business intelligence application component (e.g., a business intelligence application executing on one or more of the VMs 114) depends on a particular configuration of a database component (e.g., a database executing on one or more of the VMs 114) and the configuration of the database component changes, the example business intelligence application and/or the example database may be identified as candidates for being the cause of the failure. In this example, the application availability enhancer 144 identifies the database as the source of the unavailability and identifies the business intelligence application as a dependent application, because the application availability enhancer 144 determines that the business intelligence application is dependent on the database application according to the application blueprint 126. The example application availability enhancer 144 may identify a further dependent application component as a web server that provides a user interface with the business intelligence application via a web page.

Upon identifying the cause of the unavailability, the example application availability enhancer 144 accesses a remediation policy associated with the associated failure and/or the application component responsible for the failure. For example, the application availability enhancer 144 may perform a lookup in a lookup table or a database using the application component(s) that have been determined to be the cause of the failure as a key for the lookup. In the example database failure described above, an associated remediation policy may include restarting the database, re-configuring the database based on a default configuration, and restarting the business intelligence application instructs the first application component manager 150 to restart the database and to re-configure the database with the default configuration when the database has been restarted.

When the first application component manager 150 has completed its tasks for restarting the database, the example application availability enhancer 144 instructs the second application component manager 152 to restart the example business intelligence component in accordance with the remediation policy. In some examples, restarting an application component includes restarting the virtual machine(s) 114 on which the component is implemented and/or restarting the software (e.g., middleware) within the virtual machine(s) 114. Other methods of restarting components may additionally or alternatively be used.

The example system 100 of FIG. 1 further includes a VM availability enhancer 154. The example VM availability enhancer 154 monitors the health of the VMs 114 and/or the underlying hardware (e.g., hardware that is not monitored by the example application availability enhancer 144). For example, the VM availability enhancer 154 may identify issues causing failures on an individual VM 114 in a cluster of VMs 114 that implement one application component by monitoring the status of the VM 114 via an agent 115 installed on the VM 114. The example VM availability enhancer 154 resets the VM 114 (and/or the underlying hardware) to make the VM 114 available again without impacting the application component as a whole (e.g., because operations can temporarily fail over to other VMs 114 while the VM 114 is reset). The example VM availability enhancer 154 may be implemented using, for example, vSphere® High Availability available from VMware, Inc. In combination, the example application availability enhancer 144 and the VM availability enhancer 154 may provide coverage for each potential point of failure in the example multi-tier application 102.

In some examples, the application availability enhancer 144 performs remediation (e.g., executes the instructions in the remediation policy) using vSphere® App HA available from VMware, Inc.

Figure 2A:
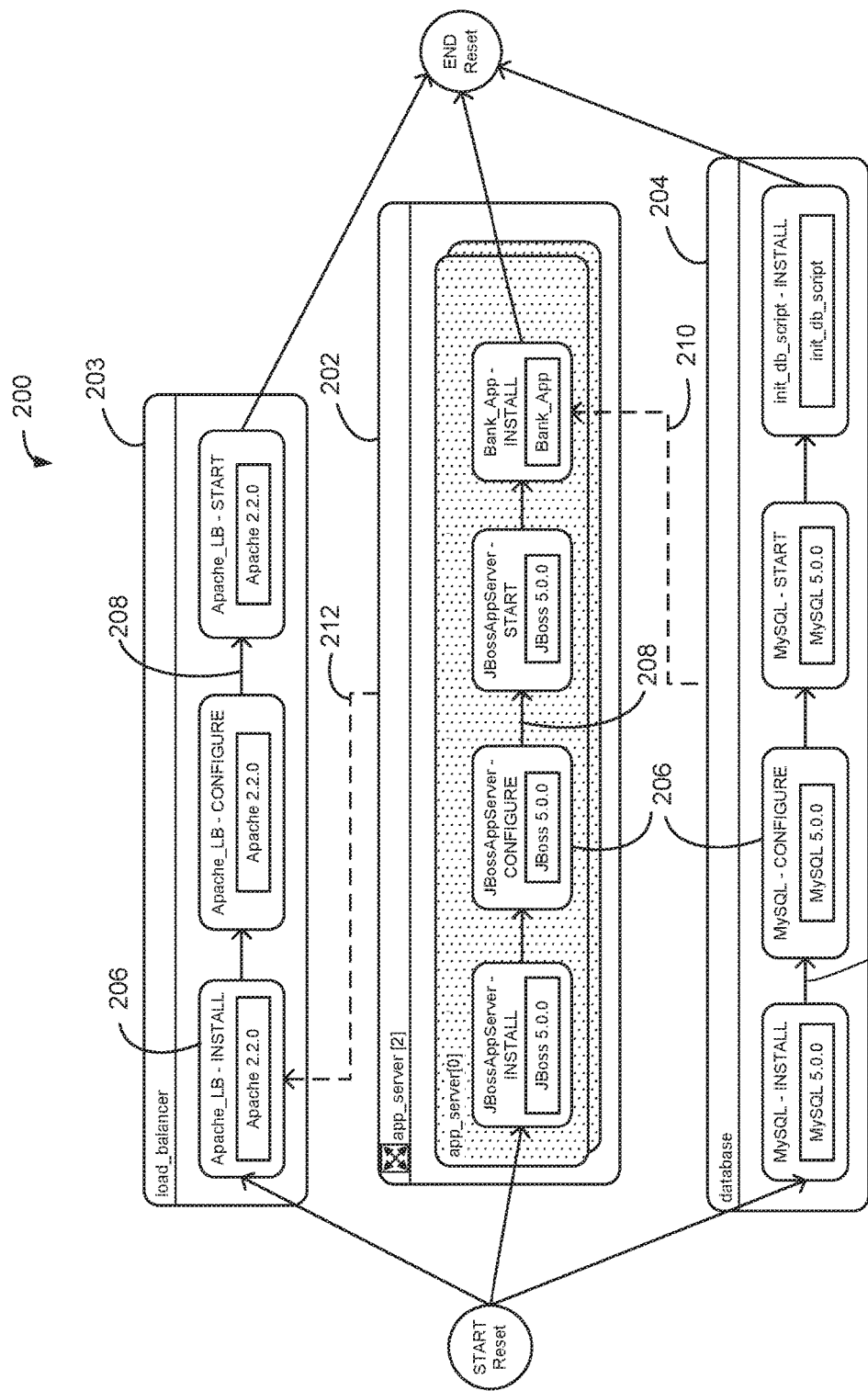
FIGS. 2A and 2B are graphical illustrations of example remediation policies generated according to an application blueprint for a multi-tier application.

FIG. 2A shows an example remediation policy 200 generated by the remediation policy generator 146 according to the example application blueprint 126 of FIG. 1. The example remediation policy 200 of FIG. 2A may be generated for execution or implementation when a particular application component is identified as a cause of unavailability of the multi-tier application 102 of FIG. 1.

The example remediation policy 200 of FIG. 2A includes application components 202-204 that may be implemented by one or more VMs (e.g., the VMs 114 of FIG. 1). Each component 202-204 includes multiple tasks 206 representing action scripts to be executed on the virtual machine(s) 114 associated with the application component 202. FIG. 2A depicts a three-tiered application example having a JBoss application server component 202 executing a web application (e.g., "bank_app"), an Apache load balancer component 203, and a MySQL database component 204.

Dependencies that represent an order of execution of the tasks 206 are depicted in FIG. 2A by solid directional lines 208 (to represent intra-component or intra-VM dependencies) and dashed directional lines 210 (to represent inter-component dependencies). Accordingly, the example remediation policy 200 specifies a given task 206 does not begin execution until a preceding task, as indicated by directional lines 208, has been completed. For example, a VM implementing the component 204 (labeled as "database") executes tasks (e.g., action scripts) for installing, configuring, and starting a MySQL database service (scripts identified as "MySQL—INSTALL," "MySQL—CONFIGURE," "MySQL—START," respectively). Because of the dependency implied by the container-relationship between the MySQL database and SQL script, the task for executing the "init_db_script" SQL script (e.g., "init_db_script—INSTALL") is placed after the last task for deploying the MySQL database (e.g., "MySQL—START") has been completed. Similarly, the tasks for deploying the bank application (e.g., "Bank_App—INSTALL") are placed after the last task for deploying the JBoss application server.

The example remediation policy 200 further specifies inter-component dependencies, in which a task 206 is to wait for completion of a prior task in associated with another component 202-204 to be completed, as indicated by a dashed directional line 210. In the three-tiered application example, the remediation policy 200 specifies that at least a portion of the tasks for deploying the application server component 202 (e.g., "bank_app—INSTALL") do not begin execution until the task for executing the database initialization script (e.g., "init_db_script—INSTALL") as part of the database component 204 has been completed. Similarly, the example remediation policy specifies that the tasks associated with the load balancer component 203 do not begin until the application server component 202 has been reset, as shown by dashed directional line 212.

Figure 2B:
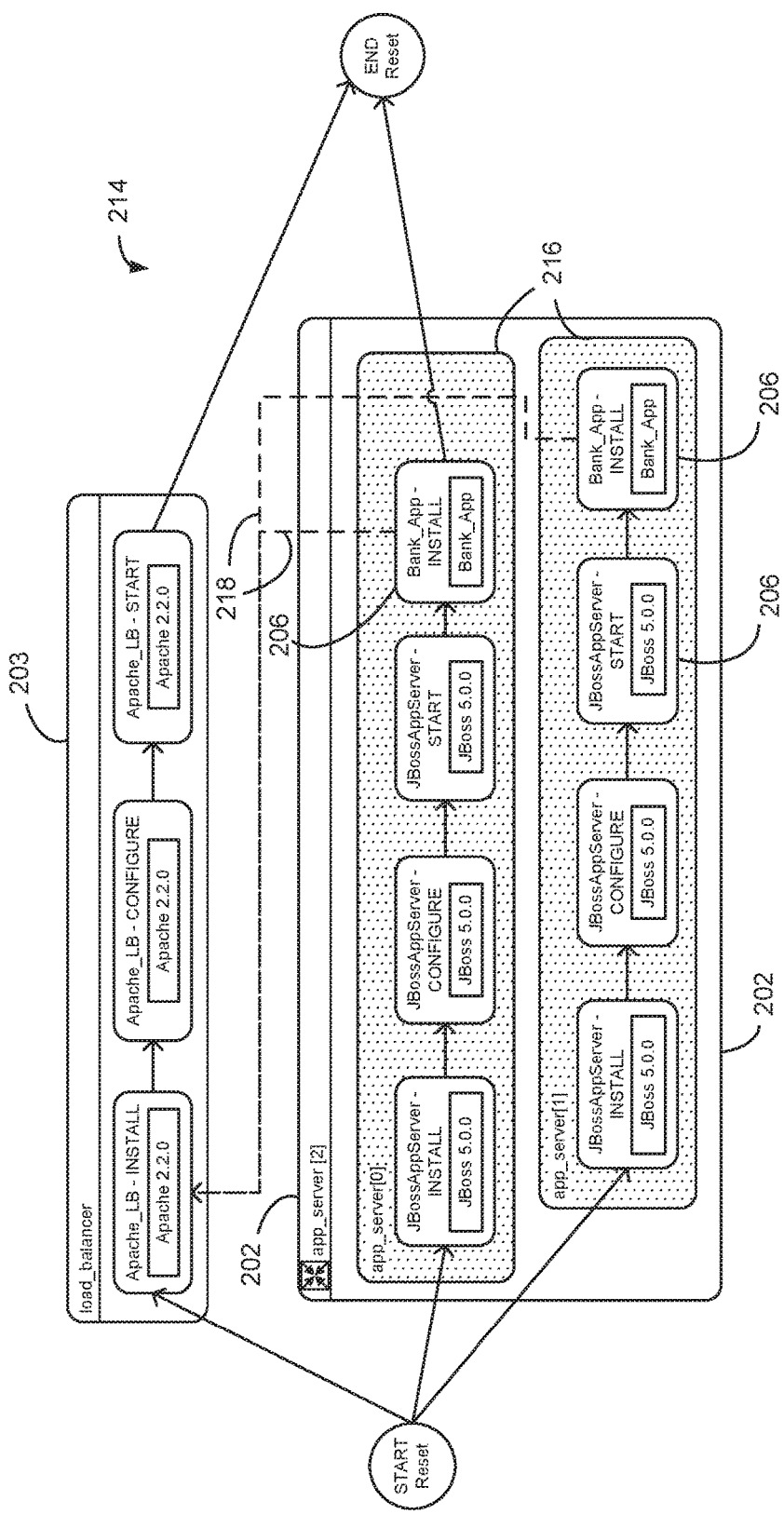

FIG. 2B illustrates a second example remediation policy 214 generated by the example remediation policy generator 146 of FIG. 1 and implemented when the example application server component 202 is identified by the application availability enhancer 144 as the source of failure of the multi-tier application 102. The example remediation policy 214 of FIG. 2B and the remediation policy 200 of FIG. 2A are generated for the same multi-tier application 102 but are to be implemented under different circumstances (e.g., in response to different failures detected by the application monitor 148). For example, the remediation policy 200 of FIG. 2A may be invoked based on a lookup when the database component 204 is identified as the source of the unavailability, while the remediation policy 214 of FIG. 2B may be invoked based on a lookup of the same lookup table when the application server component 202 is identified as the source of the unavailability.

In the three-tiered application example of FIG. 2B, the application server component 202 (e.g. "app_server") is depicted as having multiple sub-nodes 216 (e.g., identified as "app_server[0]" and "app_server[1]"). Each sub-node 216 includes an additional set of dependencies (depicted with directional dashed lines 218) for the example load balancer 203 indicating that the tasks 206 in all sub-nodes 216 of the application server component 202 must be completed before the tasks 206 in the other load balancer component 203 may begin. For example, in the three-tiered application example, the remediation policy 214 indicates that the bank_app INSTALL tasks 206 in app_server[0] and app_server[1] sub-nodes 216 must both be completed before the INSTALL task for the load balancer component 203 may begin.

As mentioned above, the example VM analyzer 122 of FIG. 1 identifies dependencies based on the configurations of the components or nodes, and the example remediation policy generator 146 uses the identified dependencies to generate the example remediation policies 200, 214. For example, in FIG. 2A, the example VM analyzer 122 identifies the dependency of the application server component 202 on the database component 204 and, as a result, includes dependencies corresponding to the inter-node dependency 210 in the application blueprint 126. Then, the example remediation policy generator 146 consults the application blueprint 126 to generate a remediation policy based on the dependencies defined in the application blueprint 126 (e.g., to determine an order in which to restart components after a given component is identified as a point of failure). In some examples, the remediation policies 200, 214 may be partially or completely defined and/or modified by the administrator 116 or other managerial user of the system 100. For example, the user may browse the application topology (e.g., identified by the VM analyzer 122 and/or assembled by the application blueprint generator 124), manually define a start-up order and/or dependencies between two or more of the application components, and/or choose one or more components (e.g., critical components) for which remediation policies are to be defined.

While an example manner of implementing the system 100 is illustrated in FIG. 1, one or more of the elements, processes and/or devices illustrated in FIG. 1 may be combined, divided, re-arranged, omitted, eliminated and/or implemented in any other way. Further, the example application director 106, the example virtual infrastructure navigator 108, the example service analyzer 120, the example VM analyzer 122, the example application blueprint generator 124, the example application definition generator 128, the example application availability enhancer 144, the example remediation policy generator 146, the example application component managers 150, 152, the example VM availability enhancer 154, the example application monitor 148, and/or, more generally, the example system 100 of FIG. 1 may be implemented by hardware, software, firmware and/or any combination of hardware, software and/or firmware. Thus, for example, any of the example application director 106, the example virtual infrastructure navigator 108, the example service analyzer 120, the example VM analyzer 122, the example application blueprint generator 124, the example application definition generator 128, the example application availability enhancer 144, the example remediation policy generator 146, the example application component managers 150, 152, the example VM availability enhancer 154, the example application monitor 148 and/or, more generally, the example system 100 could be implemented by one or more analog or digital circuit(s), logic circuits, programmable processor(s), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example application director 106, the example virtual infrastructure navigator 108, the example service analyzer 120, the example VM analyzer 122, the example application blueprint generator 124, the example application definition generator 128, the example application availability enhancer 144, the example remediation policy generator 146, the example application component managers 150, 152, the example VM availability enhancer 154, and/or the example application monitor 148 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 may include one or more elements, processes and/or devices in addition to, or instead of, those illustrated in FIG. 1, and/or may include more than one of any or all of the illustrated elements, processes and devices.

Flowcharts representative of example machine readable instructions for implementing the system 100 of FIG. 1 are shown in FIGS. 3, 4, 5, 6 and 7A-7B. In this example, the machine readable instructions comprise programs for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 3, 4, 5, 6 and 7A-7B, many other methods of implementing the example system 100 may alternatively be used. For example, the order of execution of the blocks may be changed, and/or some of the blocks described may be changed, eliminated, or combined.

As mentioned above, the example processes of FIGS. 3, 4, 5, 6 and 7A-7B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 3, 4, 5, 6 and 7A-7B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 3:
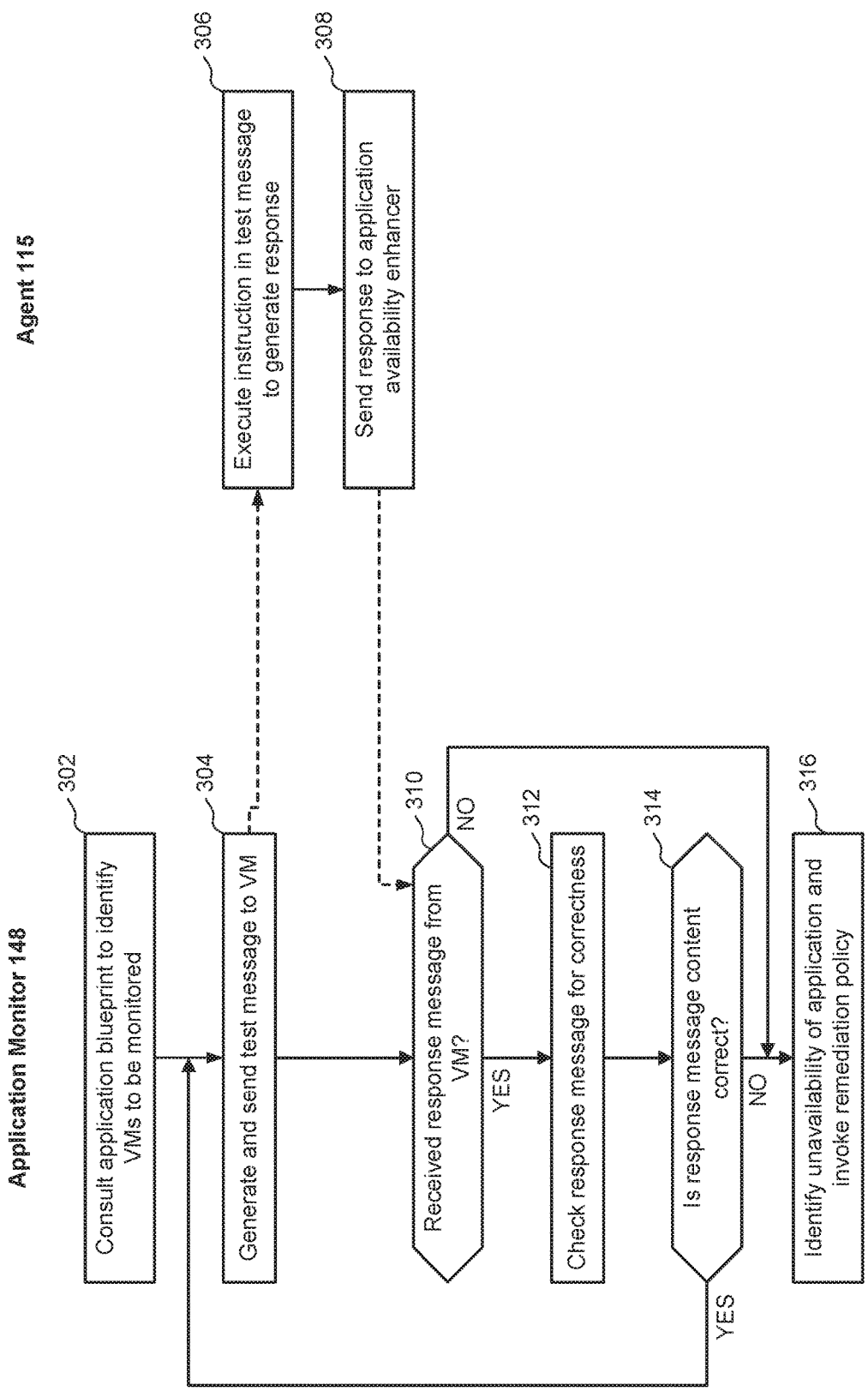
FIG. 3 is a flow diagram representative of example machine readable instructions which may be executed to enhance the availability of a multi-tier application.

FIG. 3 is a flow diagram representative of example machine readable instructions 300 which may be executed to enhance the availability of a multi-tier application. The example instructions 300 are executed by the example application monitor 148 of FIG. 1 and one or more VMs 114 in the multi-tier application 102 for which availability is being monitored. Alternatively, the example instructions 300 may be executed The example application monitor 148 consults an application blueprint 126 to identify VMs 114 to be monitored (block 302). For example, the application blueprint 126 may include services executing on or via the VMs 114, operating systems and/or applications executing on the VMs 114, and/or those VMs 114 that are to be monitored. The example application monitor 148 (e.g., via one of the application component managers 150, 152) generates and sends an availability test message to an identified VM 114 (block 304). The test message may be a heartbeat request, a request for data, or any other type of test for availability.

The example VM 114 executes the instruction in the availability test message (received from the application monitor 148) to generate a response (block 306). The instruction may be as simple as a ping to elicit a response and/or a specialized instruction specific to the type of application component associated with the VM 114. For example, a database application component may include a piece of test data that can be retrieved in response to a query in the availability test message. As another example, a business intelligence application component may perform a calculation based on test data included in the availability test message to generate a predictable response.

If the component executing on the VM 114 is available (e.g., operational), the example VM 114 (e.g., the component, an agent, etc.) sends a response to the application monitor 148 (block 308). However, if the VM 114 is unavailable, blocks 306 and/or 308 may fail and the VM 114 may return an incorrect response or no response at all. The application monitor 148 determines whether a response message has been received from the VM 114 (e.g., in response to the availability test message of block 304) (block 310). If a response message has been received (block 310), the example application monitor 148 checks the received response message for correctness (block 312). For example, the application monitor 148 compares the content of the response message to expected content (e.g., data expected in response to the availability test message). If the response message content is correct (block 314), the application monitor 148 generates and sends another availability test message to the VM 114 (e.g., after waiting a period of time or interval to avoid unnecessarily burdening the multi-tier application) to continue monitoring the availability. In some examples, the interval is not more than a greatest length of allowable unavailability.

If the response message content is incorrect (block 314), or if a response message has not been received (block 310), the example application monitor 148 identifies the application as being unavailable and invokes (e.g., applies) a remediation policy to restore availability (block 316). Invocation and application of the remediation policy are described below with reference to FIG. 4 and FIGS. 7A-7B.

Figure 4:
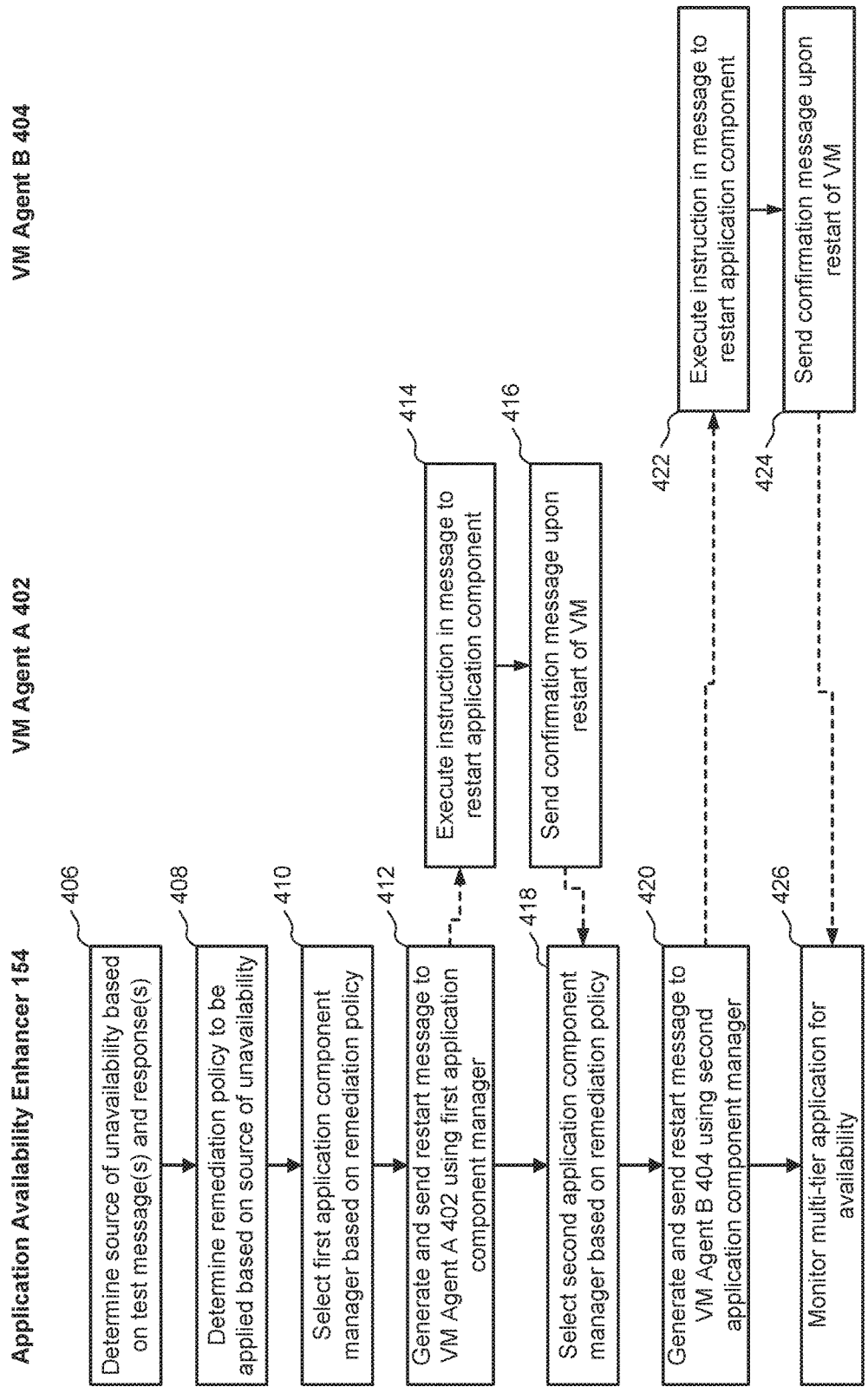
FIG. 4 is a flow diagram representative of example machine readable instructions which may be executed to restart application components in a multi-tier application in accordance with a remediation policy.

FIG. 4 is a flow diagram representative of example machine readable instructions 400 which may be executed to restart application components in a multi-tier application. The example instructions 400 may be executed by the application availability enhancer 144 of FIG. 1 in response to identifying unavailability of a multi-tier application including at least VMs having the first and second agents 402 and 404 (e.g., VMs 114 of FIG. 1). In the example of FIG. 4, the VM having the second agent 404 has a dependency on the VM having the first agent 402.

The example application monitor 148 determines a source of the unavailability based on one or more availability test message(s) and/or response(s) to availability test message(s) (block 406). For example, the application monitor 148 may execute the instructions 300 of FIG. 3 with either or both of the agents 402, 404 of FIG. 4 to identify unavailability of the multi-tier application. The example application monitor 148 identifies the source of the unavailability by, for example, determining application component(s) that do not return correct response messages and do not have any dependencies on application component(s) that do not return correct response messages. In other words, the example application monitor 148 determines the responsible application component to be the component that is highest in a dependency hierarchy (where a first component is lower in the hierarchy than a second component on which the first component is dependent).

Based on the identified source of the unavailability, the example application availability enhancer 144 determines a remediation policy to be applied (or invoked) (block 408). For example, the application availability enhancer 144 may look up a remediation policy that has been defined to handle failures of the application component identified in block 406 as the source of the unavailability. The remediation policies may be defined by a user and/or automatically defined based on the identification of dependencies in the application blueprint 126.

When the remediation policy has been selected, the example application availability enhancer 144 selects a first application component manager (e.g., the first application component manager 150 of FIG. 1) based on the remediation policy (block 410). For example, the first application component manager 150 may be selected based on determining that the VM 402 is associated with a particular API and/or protocol. The application availability enhancer 144 generates and sends (e.g., via the selected application component manager 150) a first restart message to the first VM 402 (e.g., the highest-level application component that is unavailable or malfunctioning in a dependency hierarchy) using a first application component manager (e.g., the first application component manager 150 of FIG. 1) (block 412).

For example, the application component manager 150 generates and sends a first restart message via an API associated with the VM 402.

The example VM 402 executes instruction(s) in the message to restart the application component(s) associated with the VM 402 (block 414). Upon confirming that the VM 402 (and/or services or applications executing on the VM 402) has been restarted, the example VM 402 sends a confirmation message to the application availability enhancer 144 (e.g., to the application component manager 150) to confirm that the VM 402 has successfully restarted (block 416). When the application availability enhancer 144 receives the confirmation message, the example application availability enhancer 144 selects a second application component manager (e.g., the application component manager 152 of FIG. 1) based on the remediation policy (block 418). For example, the application availability enhancer 144 selects the second application component manager 152 based on an API used by the second VM 404 and based on the VM 404 having a dependency on the VM 402. The example application availability enhancer 144 generates and sends a restart message to the VM 404 via the second application component manager 152 (block 420).

The example VM 404 executes instruction(s) in the restart message to restart the application component(s) associated with the VM 404 (block 422). Upon confirming that the VM 404 (and/or services or applications executing on the VM 404) has been restarted, the example VM 404 sends a confirmation message to the application availability enhancer 144 (e.g., to the application component manager 152) to confirm that the VM 404 has successfully restarted (block 424).

The example application availability enhancer 144 receives the confirmation message (e.g., via the application component manager 152), at which time the multi-tier application of this example is expected to be fully available (e.g., following recovery from the failure). However, in other examples, the application availability enhancer 144 and/or the application component managers 150, 152 iterate through blocks 410-412 and/or 418-420 for additional VMs based on the dependencies of the application and/or the source of the unavailability. When the required services (e.g., middleware), applications, and/or VMs 402, 404 have been restarted and/or the confirmation messages have been received, the example application availability enhancer 144 resumes monitoring the multi-tier application for availability (block 426). For example, the application monitor 148 may resume or restart the instructions 300 of FIG. 3 for the multi-tier application.

Figure 5:
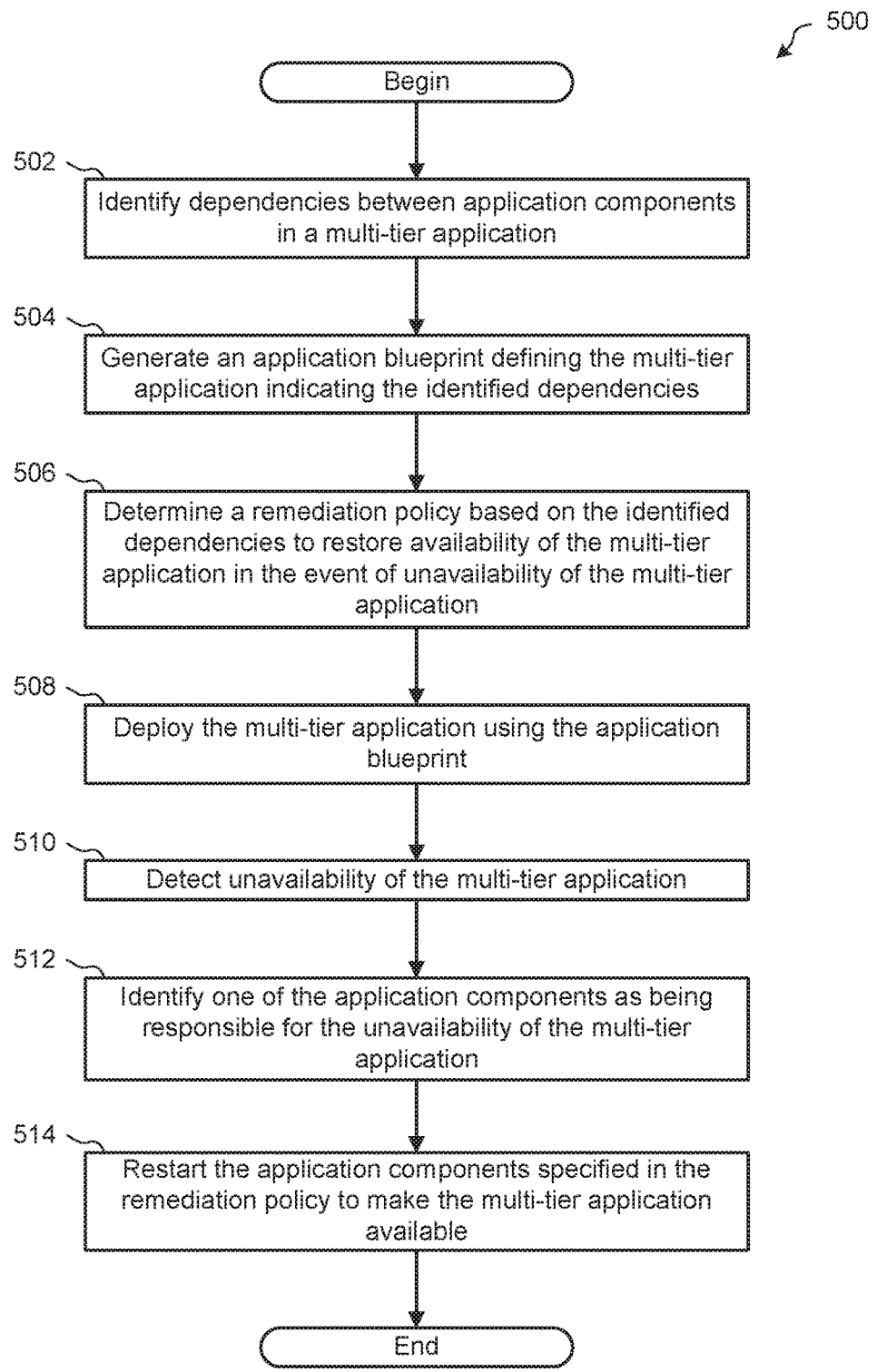
FIG. 5 is a flow diagram representative of example computer readable instructions which may be executed to implement the example system of FIG. 1 to enhance the availability of multi-tier applications on cloud computing platforms.

FIG. 5 is a flow diagram representative of example computer readable instructions 500 which may be executed to implement the example system 100 of FIG. 1 to enhance the availability of multi-tier applications on cloud computing platforms. The example instructions 500 may be performed when, for example, the example service analyzer 120 of FIG. 1 has identified the example VMs 114 in the example deployment environment 104 for analysis and identification of dependencies and generation of the example application blueprint 126.

The example VM analyzer 122 of FIG. 1 identifies dependencies between the application components in a multi-tier application (e.g., the multi-tier application 102 of FIG. 1) (block 502). For example, the VM analyzer 122 of FIG. 1 executes discovery scripts to identify configuration items that indicate dependency relationships between the VMs 114 and/or services, applications, and/or operating systems executing on the VMs 114. The identified configuration items may indicate the existence of dependencies alone or in combinations of configuration items.

The example application blueprint generator 124 generates the example application blueprint 126 defining the multi-tier application 102 indicating the identified dependencies (block 504). For example, the application blueprint 126 may specify component templates and configuration items that are usable by the application director 106 to deploy the example multi-tier application 102.

The example application availability enhancer 144 generates a remediation policy (e.g., via the remediation policy generator 146), based on the identified dependencies, to restore availability of the multi-tier application 102 in the event of unavailability of the multi-tier application (block 506). For example, the remediation policy generator 146 may generate a separate remediation policy for each potential point of failure (e.g., for each application component) to perform remediation in the event that the corresponding application component is the source of the failure. In some examples, a user of the system 100 (e.g., the administrator 116, the developer 118) may choose one or more of the application components for which remediation policies are to be defined and/or manually define all or a portion of the remediation policy for an application component.

To generate a remediation policy, the example remediation policy generator 146 identifies application components to be restarted in the event of a failure of a given application component, determines one or more application component managers 150, 152 to be used to communicate with the identified application component(s) (e.g., based on the API or other communication requirements of the application component(s)), and generates instructions to make each of the identified application components available. Instructions to restart an application component may include, for example, instructions to a hypervisor to restart a VM, instructions to apply a particular state (e.g., disk image) to a VM, instructions to a VM to restart an operating system, instructions to a VM and/or to an operating system on the VM to restart a service, an application, and/or other software or middleware associated with the application component, and/or any other appropriate instructions for making the application component operational and available for use in the multi-tier application.

The example application director 106 of FIG. 1 deploys the multi-tier application 102 using the application blueprint 126 (block 508). After the multi-tier application 102 has been deployed, the application availability enhancer 144 detects that the multi-tier application 102 is unavailable (e.g., via the application monitor 148) (block 510). For example, the application monitor 148 may execute the example instructions 300 of FIG. 3 and/or the instructions 700 of FIGS. 7A-7B discussed below.

The example application monitor 148 identifies one of the application components as being responsible for the unavailability of the example multi-tier application 102 (block 512). For example, the application monitor 148 may determine that an application component is responsible for the unavailability when the component that is unresponsive or does not correctly respond, and the component is not dependent on any other unresponsive or incorrectly-responsive components (e.g., based on availability test messages and responses, and based on determining dependencies from the application blueprint 126).

The example application availability enhancer 144 restarts the application components specified in the remediation policy to make the example multi-tier application 102 available (e.g., to restore availability of the multi-tier application 102) (block 514). For example, the application availability enhancer 144, via the application component managers 150, 152, transmits instructions to the VMs 114 to restart the application components executing via the VMs 114 in a specified order according to the remediation policy. As a result of the remediation policy, the example multi-tier application 102 is made available. The example instructions 500 of FIG. 5 then end.

Figure 6:
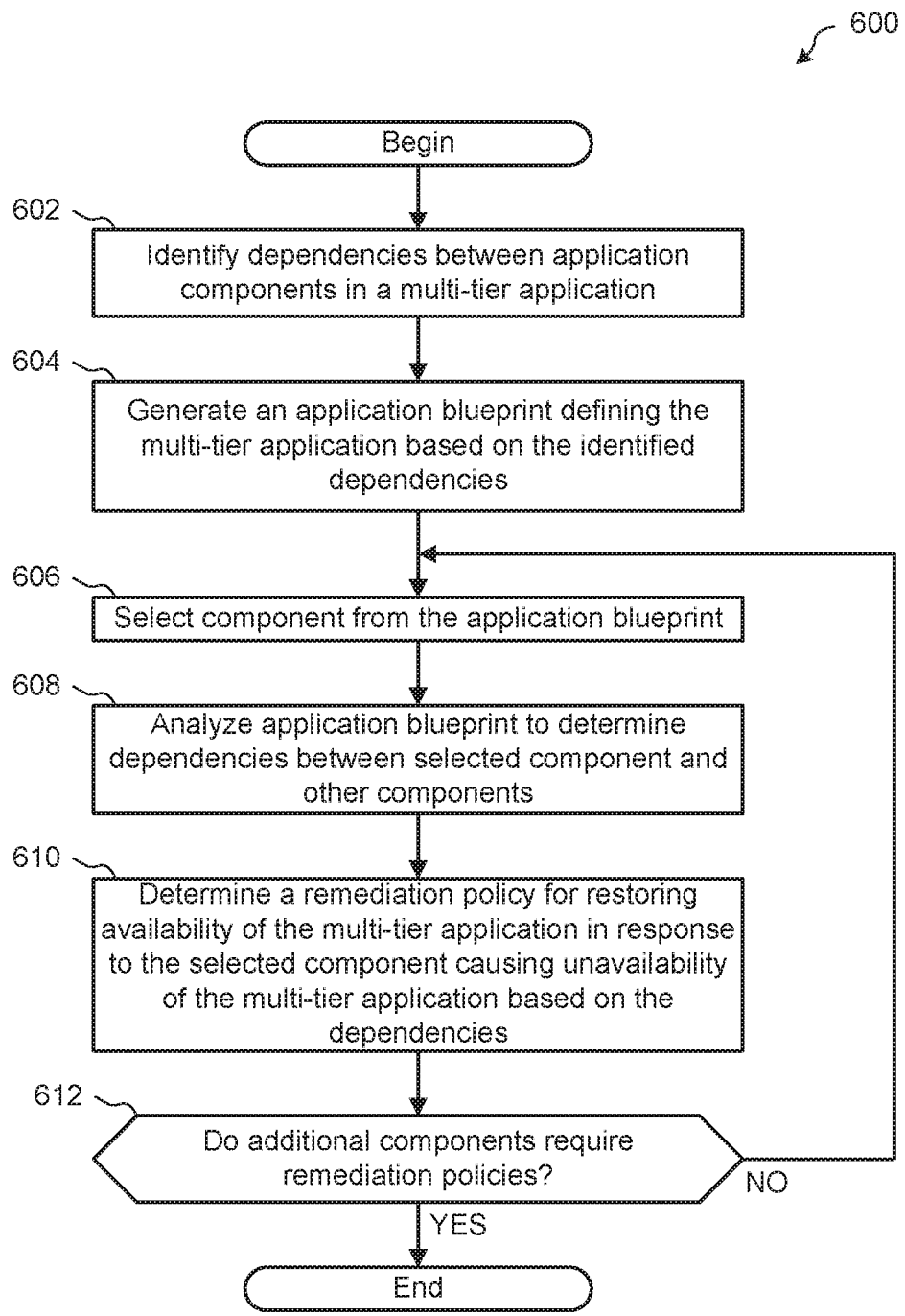
FIG. 6 is a flow diagram representative of example computer readable instructions which may be executed to implement the example application director of FIG. 1 to generate remediation policies for a multi-tier application.

FIG. 6 is a flow diagram representative of example computer readable instructions 600 which may be executed to implement the example virtual infrastructure navigator 108 and the example application availability enhancer 144 of FIG. 1 to generate a remediation policy to enhance the availability of the multi-tier application 102. The example instructions 600 of FIG. 6 bypass the example application director 106 and the application blueprint 126 of FIG. 1 and, instead, generate remediation policies directly from the example application blueprint 126 generated by the example virtual infrastructure navigator 108.

The example VM analyzer 122 of FIG. 1 identifies dependencies between application components in a multi-tier application (block 602). For example, the VM analyzer 122 may execute one or more discovery scripts to identify configuration items in each VM 114 of the multi-tier application 102. The dependencies may include, for example, a need for input data and/or confirmation of performance of a first task by a first service prior to execution of a second task by a second service. Execution of the discovery scripts may reveal dependencies based on, for example, open communication ports, public APIs, network adapter configuration information, active network connections, and/or other configuration information and/or combinations of configuration elements.

The example application blueprint generator 124 of FIG. 1 generates an application blueprint 126 defining the multi-tier application 102 based on the identified dependencies (and other configuration items and/or templates that may be used to define the multi-tier application for deployment) (block 604). In some examples, the application blueprint 126 is already defined, and blocks 602 and 604 may be omitted.

The example application availability enhancer 144 of FIG. 1 selects (e.g., via the remediation policy generator 146) a node (e.g., an application component such as VM, a service or an application executing on a VM, and/or any other type of node) from the application blueprint 126 (block 606). In an illustrative example, the remediation policy generator 146 selects a business intelligence application node in a three-tier application that includes a load balancer service, the business intelligence application, and a database service. Each tier of the multi-tier application 102 is implemented using one or more VMs 114 that are separate from the VMs 114 of another tier. In this example, the business intelligence application is dependent on the database service for data used to perform calculations or other data processing, and the load balancer is dependent on the configuration of the VMs 114 that implement the business intelligence application to correctly balance the load between multiple VMs 114 implementing the business intelligence application.

The example remediation policy generator 146 analyzes the example application blueprint 126 to identify the dependencies between the selected node and other nodes (e.g., as noted in the application blueprint 126) (block 608). In the example of FIG. 6, the remediation policy generator 146 does not need to re-discover the dependencies already discovered by the VM analyzer 122.

The example remediation policy generator 146 generates a remediation policy for restoring availability of the multi-tier application 102 (defined by the application blueprint 126) in response to the selected component (e.g., the business intelligence application) causing unavailability of the multi-tier application 102 (block 610). The example application availability enhancer 144 determines (e.g., defines, creates) the remediation policy based on the dependencies identified in block 608. The remediation policy includes instructions to restart the selected component (e.g., the business intelligence application) and any components that are dependent on the selected component (e.g., the load balancer component). The example application availability enhancer 144 further includes pre-conditions (e.g., timing requirements, confirmation message requirements, etc.) for transmitting all or part of the instructions to an application component. For example, the remediation policy may specify that the VMs 114 that are to implement the business intelligence application be configured with a network address prior to transmitting the restart instructions to the load balancer component. Alternatively, the remediation policy may specify that the business intelligence application be completely online and functioning prior to restarting the load balancer component. In some examples, the remediation policy includes an indication of which of the application component managers 150, 152 is to be used for each of the example sets of instructions. Alternatively, the application component manager 150, 152 may be determined at the time of execution of the remediation policy.

The example application availability enhancer 144 determines whether any additional components require remediation policies (block 612). If additional remediation policies are to be created (block 612), control returns to block 606 to select another component from the application blueprint 126. If no more remediation policies are to be created (block 612), the example instructions 600 may end.

Figure 7A:
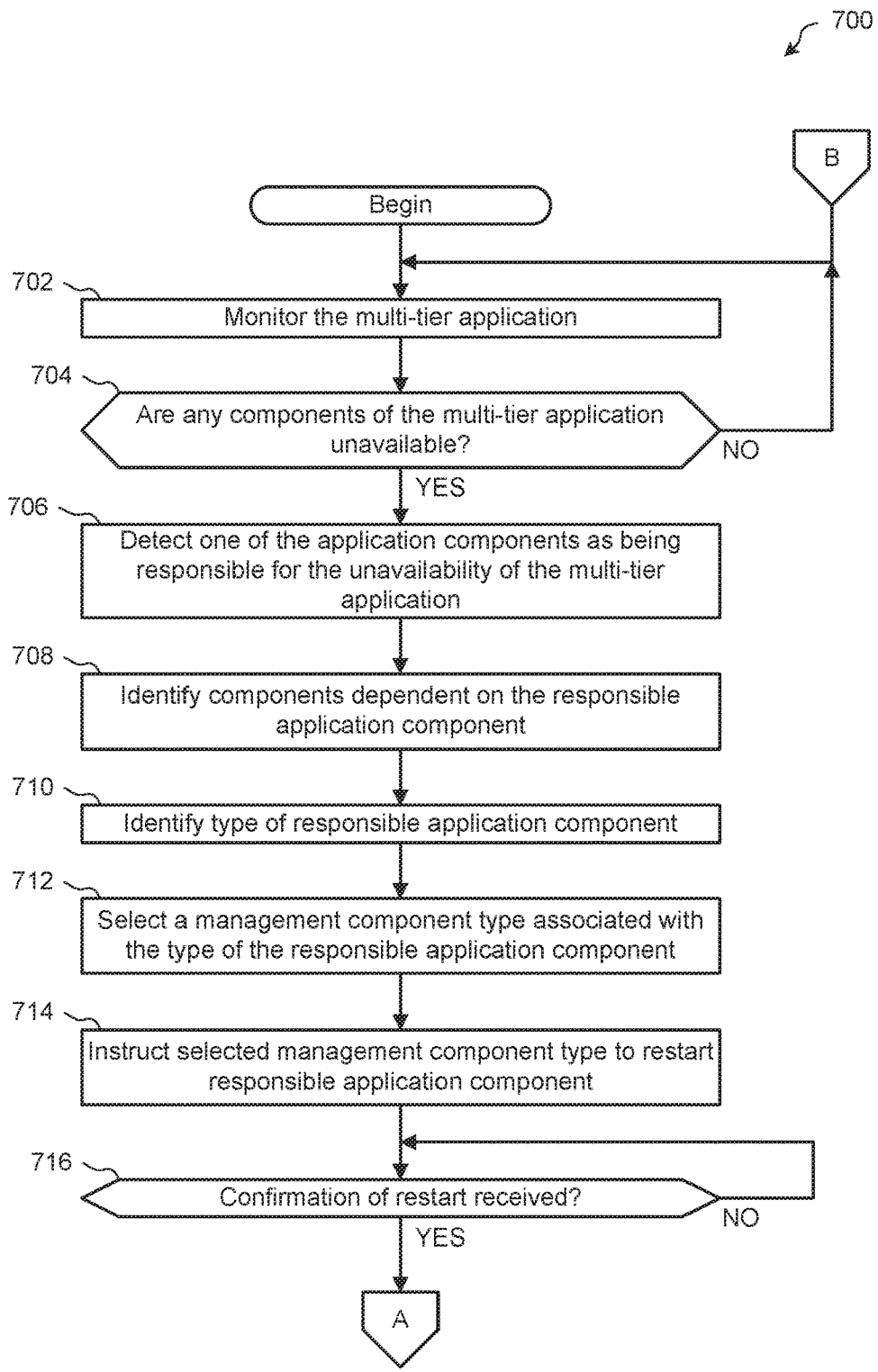
FIGS. 7A and 7B show a flow diagram representative of example computer readable instructions which may be executed to implement the example application availability enhancer of FIG. 1 to monitor and enhance the availability of a multi-tier application.
Figure 7B:
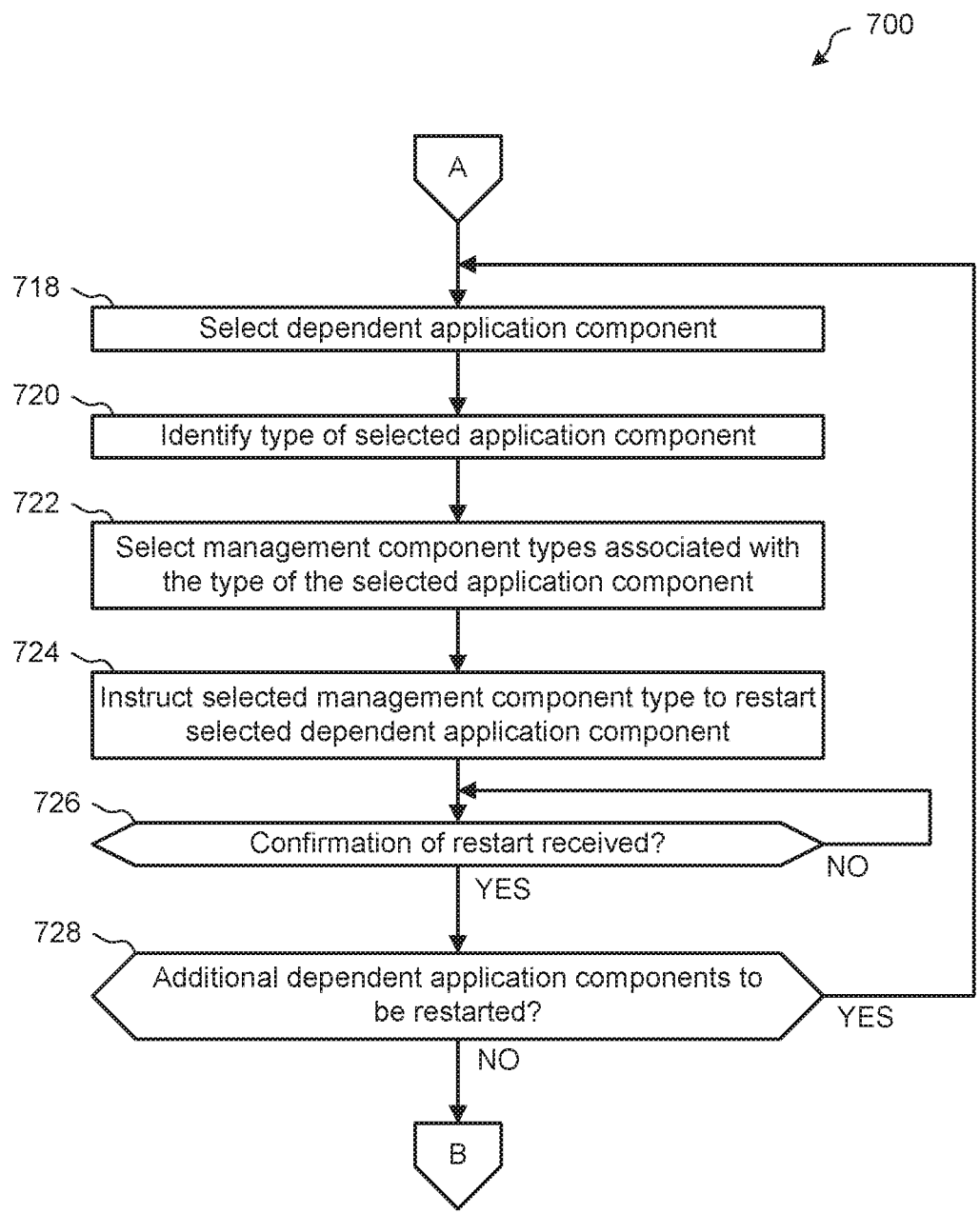

FIGS. 7A and 7B show a flow diagram representative of example computer readable instructions 700 which may be executed to implement the example application availability enhancer 144 of FIG. 1 to monitor and enhance the availability of the example multi-tier application 102. The example application availability enhancer 144 performs the example instructions 700 when remediation policies have been defined for the multi-tier application 102 and the multi-tier application has been deployed in a deployment environment 112.

The example application availability enhancer 144 (e.g., via the application monitor 148) monitors the multi-tier application (block 702). For example, the application monitor 148 periodically or a periodically transmits availability test messages to the example application components and compares response messages to expected responses. The example application monitor 148 may execute the instructions 300 of FIG. 3 to implement block 702.

The example application monitor 148 determines whether any components of the example multi-tier application 102 are unavailable (block 704). For example, the application monitor 148 may compare the content of a response message that is received in response to an availability test message to an expected or correct response, and/or determine if no response has been received. If none of the components are determined to be unavailable (block 704), control returns to block 702 to continue monitoring the example multi-tier application 102. In an illustrative example, the application monitor 148 determines that the business intelligence application component and the database component of the example three-tier application described above in conjunction with FIG. 6 are unavailable (e.g., due to not receiving responses to availability test messages from either the business intelligence application component or the database component.

If one or more of the components of the example multi-tier application 102 are determined to be unavailable (block 704), the example application monitor 148 detects which one of the application components is responsible for the unavailability of the multi-tier application 102 (block 706). For example, where only one application component is unavailable, the application monitor 148 determines that the unavailable component is the responsible component. When more than one application component is unavailable based on the monitoring, the example application monitor 148 determines that the responsible component is the component highest in a hierarchy of dependencies (e.g., the component that is not dependent on any unavailable components). In the example above, the example application availability enhancer 144 determines that the database component is responsible for the failure because the database component is highest in the hierarchy of dependencies according to the example application blueprint 126.

The example application availability enhancer 144 identifies the components in the example multi-tier application 102 that are dependent on the responsible application component (e.g., the application component identified in block 706) (block 708). For example, the application availability enhancer 144 may determine the dependent components based on the application blueprint 126. In the above example, the application availability enhancer 144 identifies the business intelligence application component as dependent on the database component, and further identifies the load balancer component as dependent on the database component as a result of being dependent on the business intelligence application component.

The example application availability enhancer 144 identifies a type of the responsible application component (block 710). For example, the application availability enhancer 144 may determine a type of VM associated with the component, a type of operating system associated with the component, and/or a type of API through which the component may be managed. The example application availability enhancer 144 selects a management component type (e.g., one of the application component managers 150, 152) associated with the type of responsible application component (e.g., based on a type of API or other communication interface exposed or used by the responsible application component) (block 712). The example application availability enhancer 144 instructs the selected management component type (e.g., one of the application component managers 150, 152) to restart the responsible application component (block 714). For example, based on the types of VMs 114 implementing the database component, the application availability enhancer 144 selects the application component manager 150 to interface with the database component for restarting the database component.

The example application availability enhancer 144 (e.g., via the application component manager 150) determines whether a confirmation has been received that the application component has been restarted (block 716). For example, the instructions provided to the database component (e.g., to the VM 114 implementing the database component) may include instructions to transmit a confirmation message upon a successful restart of the database component. If the confirmation has not been received (block 716), control loops to block 716 to continue to wait for the confirmation. In some examples, the application availability enhancer 144 may include a timeout function to cause the application availability enhancer 144 to send second instructions to restart the application component and/or to take an alternate remedial action.

When the confirmation has been received that the responsible application component has been restarted (block 716), control is transferred to block 718 of FIG. 7B, at which the example application availability enhancer 144 selects a dependent application component. For example, the application availability enhancer 144 may identify one or more application components that are dependent on the responsible application component in accordance with the remediation policy. In the example above, the application availability enhancer 144 identifies that the business intelligence application component is dependent on the database component and, therefore, must be restarted after the database component is restarted to ensure proper functioning of the business intelligence application component and, more generally, of the example multi-tier application 102.

The example application availability enhancer 144 identifies a type of the selected application component (block 720). Similar to identifying the type in block 710, the example application availability enhancer 144 may determine a type of VM associated with the component, a type of operating system associated with the component, and/or a type of API through which the component may be managed. The example application availability enhancer 144 selects a management component type (e.g., one of the application component managers 150, 152) associated with the type of the selected application component (block 722) and instructs the selected management component (e.g., one of the application component managers 150, 152) to restart the selected application component (block 724). For example, the application availability enhancer 144 may select the application component manager 152 to restart the business intelligence application component.

The example application availability enhancer 144 (e.g., via the application component manager 152) determines whether a confirmation has been received that the application component has been restarted (block 726). If the confirmation has not been received (block 726), control loops to block 726 to continue to wait for the confirmation. When the confirmation has been received (block 726), the example application availability enhancer 144 determines whether there are additional dependent application components to be restarted (block 728). The additional dependent application components may be dependent on the responsible application component (e.g., the database), on the most recently-restarted component (e.g., the business intelligence application component), and/or on other application components in a dependency hierarchy. The example application availability enhancer 144 identifies the additional dependent application components based on the remediation policy associated with the responsible application component (e.g., the database in the example above).

If there are additional components to be restarted (block 728), control returns to block 718 to select another component. On the other hand, when there are no more dependent application components to be restarted (e.g., all of the components have been restarted in accordance with the remediation policy) (block 728), the application availability enhancer 144 assumes that the multi-tier application 102 is available and control returns to block 702 to continue monitoring the multi-tier application 102.

Figure 8:
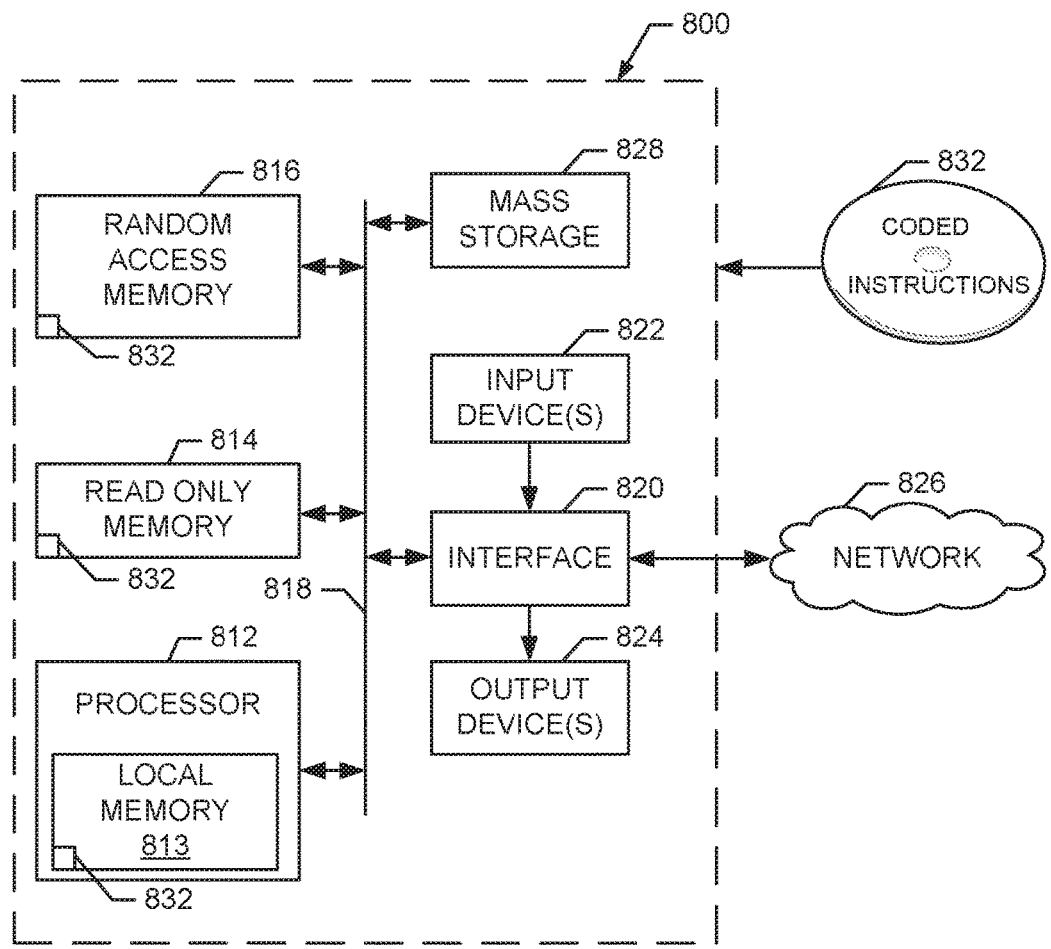
FIG. 8 is a block diagram of an example processor platform capable of executing the instructions of FIGS. 3, 4, 5, 6, and 7A-7B to implement the system of FIG. 1.

FIG. 8 is a block diagram of an example processor platform 800 capable of executing the instructions of FIGS. 3, 4, 5, 6, and/or 7A-7B to implement the application availability enhancer 144, the application component managers 150, 152, and/or the system 100 of FIG. 1. The processor platform 800 can be, for example, a server, a personal computer, an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 3, 4, 5, 6, and/or 7A-7B may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

We claim:

1. A method, comprising:

identifying, using a processor, dependencies among application components in a multi-tier application, the application components executing on at least a first virtual machine and a second virtual machine, a first agent executing on the first virtual machine, a second agent executing on the second virtual machine, a first of the dependencies including a first application component executing on the first virtual machine and a second application component executing on the second virtual machine, the first application component dependent upon the second application component;

generating, using the processor, an application blueprint defining the multi-tier application based on the identified dependencies, the application blueprint including a dependency hierarchy associated with the identified dependencies, the dependency hierarchy indicating that the second application component is at a first level in the dependency hierarchy, the dependency hierarchy indicating that the first application component is at a second level in the dependency hierarchy;

generating a remediation policy based on the dependency hierarchy in the application blueprint, the remediation policy including instructions to restore availability of the multi-tier application based on an order defined by the dependency hierarchy;

detecting unavailability of the multi-tier application based on a first response from the first agent indicating that the first virtual machine is unavailable;

in response to detecting that the first virtual machine is unavailable, detecting unavailability of the second virtual machine based on a second response from the second agent indicating that the second virtual machine is unavailable;

identifying, using the processor, the second application component on the second virtual machine as being responsible for the unavailability of the multi-tier application based on the second response, the first application component unavailable based on the unavailability of the second application component;

in response to identifying the unavailability of the multi-tier application, transmitting, using the processor, first instructions to the second agent directing the second agent to restart the second application component, the second application component selected for restart based on the dependency hierarchy; and in response to determining that the second application component restarted, transmitting, using the processor, second instructions to the first agent directing the first agent to restart the first application component based on the remediation policy to restore availability of the multi-tier application, the first application component selected for restart after the second application component is to restart based on the dependency hierarchy.

2. The method of claim 1, further including selecting a management component of a first type associated with the identified one of the application components, the management component to restart the identified one of the application components using an application programming interface associated with the identified one of the application components.

3. The method of claim 1, wherein the application components include at least one of a virtual machine, an operating system executing on a virtual machine, or middleware executing on a virtual machine.

4. The method of claim 1, further including monitoring the application components to detect at least one of a heartbeat message or a response message, the detecting of the unavailability being based on the monitoring.

5. The method of claim 1, wherein identifying the dependencies includes analyzing the application blueprint to identify parameters of at least one of the first and second virtual machines, operating systems, and middleware according to the application blueprint.

6. The method of claim 5, wherein determining the remediation policy includes analyzing the application blueprint to determine the dependencies among the application components in the application blueprint.

7. A tangible computer readable storage medium comprising computer readable instructions which, when executed, cause a processor to at least:

identify dependencies among application components in a multi-tier application, the application components executing on at least a first virtual machine and a second virtual machine, a first agent executing on the first virtual machine, a second agent executing on the second virtual machine, a first of the dependencies including a first application component executing on the first virtual machine and a second application component executing on the second virtual machine, the first application component dependent upon the second application component;

generate an application blueprint defining the multi-tier application based on the identified dependencies, the application blueprint including a dependency hierarchy associated with the identified dependencies, the dependency hierarchy indicating that the second application component is at a first level in the dependency hierarchy, the dependency hierarchy indicating that the first application component is at a second level in the dependency hierarchy;

generate a remediation policy based on the dependency hierarchy in the application blueprint, the remediation policy including instructions to restore availability of the multi-tier application based on an order defined by the dependency hierarchy;

detect unavailability of the multi-tier application based on a first response from the first agent indicating that the first virtual machine is unavailable;

detect unavailability of the second virtual machine based on a second response from the second agent indicating that the second virtual machine is unavailable when the unavailability of the first virtual machine is detected;

identify the second application component on the second virtual machine as being responsible for the unavailability of the multi-tier application based on the second response, the first application component unavailable based on the unavailability of the second application component;

transmit first instructions to the second agent directing the second agent to restart the second application component, the second application component selected for restart based on the dependency hierarchy; and transmit second instructions to the first agent directing the first agent to restart the first application component based on the remediation policy to restore availability of the multi-tier application when the second application component is determined to be restarted, the first application component selected for restart after the second application component is to restart based on the dependency hierarchy.

8. The tangible computer readable storage medium of claim 7, wherein the instructions are further to cause the processor to select a management component of a first type associated with the identified one of the application components, the management component to restart the identified one of the application components using an application programming interface associated with the identified one of the application components.

9. The tangible computer readable storage medium of claim 7, wherein the application components include at least one of a virtual machine, an operating system executing on a virtual machine, or middleware executing on a virtual machine.

10. The tangible computer readable storage medium of claim 9, wherein the instructions are to cause the processor to identify the dependencies by analyzing the application blueprint to identify parameters of the first and second virtual machines, operating systems, and middleware according to the application blueprint.

11. The tangible computer readable storage medium of claim 10, wherein the instructions are to cause the processor to determine the remediation policy by analyzing the application blueprint to determine the dependencies among the application components in the application blueprint.

12. An apparatus, comprising:
an infrastructure navigator to identify dependencies between application components in a multi-tier application, the application components executing on at least a first virtual machine and a second virtual machine, a first agent executing on the first virtual machine, a second agent executing on the second virtual machine, a first of the dependencies including a first application component executing on the first virtual machine and a second application component executing on the second virtual machine, the first application component dependent upon the second application component; and
an availability enhancer to:
generate an application blueprint defining the multi-tier application based on the identified dependencies, the application blueprint including a dependency hierarchy associated with the identified dependencies, the dependency hierarchy indicating that the second application component is at a first level in the dependency hierarchy, the dependency hierarchy indicating that the first application component is at a second level in the dependency hierarchy;
generate a remediation policy based on the dependency hierarchy in the application blueprint, the remediation policy including instructions to restore availability of the multi-tier application based on an order defined by the dependency hierarchy;
detect unavailability of the multi-tier application based on a first response from the first agent indicating that the first virtual machine is unavailable;
detect unavailability of the second virtual machine based on a second response from the second agent indicating that the second virtual machine is unavailable when the unavailability of the first virtual machine is detected;
identify the second application component on the second virtual machine as being responsible for the unavailability of the multi-tier application based on the second response, the first application component unavailable based on the unavailability of the second application component;
transmit first instructions to the second agent directing the second agent to restart the second application component, the second application component selected for restart based on the dependency hierarchy; and
transmit second instructions to the first agent directing the first agent to restart the first application component based on the remediation policy to restore availability of the multi-tier application when the second application component is determined to be restarted, the first application component selected for restart after the second application component is to restart based on the dependency hierarchy.

13. The apparatus of claim 12, wherein the availability enhancer includes a plurality of management components, the availability enhancer to select a first management component having a first type associated with the identified one of the application components, the first management component to restart the identified one of the application components.

14. The apparatus of claim 12, wherein the application components include at least one of a virtual machine, an operating system executing on a virtual machine, or middleware executing on a virtual machine.

15. The apparatus of claim 14, wherein the availability enhancer includes a remediation policy generator to generate the remediation policy by analyzing the application blueprint to determine the dependencies between application components in the application blueprint.

16. The method of claim 1, wherein the first agent has root access to the first virtual machine and the second agent has root access to the second virtual machine.

17. The method of claim 1, wherein transmitting the first instructions to the first agent is based on the first agent exposing a first application programming interface on the first virtual machine to receive the first instructions and transmitting the second instructions to the second agent is based on the second agent exposing a second application programming interface on the second virtual machine to receive the second instructions.

18. The tangible computer readable storage medium of claim 7, wherein the first agent has root access to the first virtual machine and the second agent has root access to the second virtual machine.

19. The tangible computer readable storage medium of claim 7, wherein transmitting the first instructions to the first agent is based on the first agent exposing a first application programming interface on the first virtual machine to receive the first instructions and transmitting the second instructions to the second agent is based on the second agent exposing a second application programming interface on the second virtual machine to receive the second instructions.

20. The apparatus of claim 12, wherein the first agent has root access to the first virtual machine and the second agent has root access to the second virtual machine.

21. The apparatus of claim 12, wherein transmitting the first instructions to the first agent is based on the first agent exposing a first application programming interface on the first virtual machine to receive the first instructions and transmitting the second instructions to the second agent is based on the second agent exposing a second application programming interface on the second virtual machine to receive the second instructions.

22. The method of claim 1, wherein determining that the first response from the first agent indicating that the first virtual machine is unavailable includes:
   transmitting a test message from an application monitor to the first agent, the test message including first content;
   in response to the first agent receiving the test message, receiving, at the application monitor, the first response from the first agent including second content;
   comparing, at the application monitor, the second content to third content the third content corresponding to expected content; and
   in response to the second content not matching the second third content, determining, at the application monitor, that the first virtual machine is unavailable.

23. The tangible computer readable storage medium of claim 7, wherein determining that the first response from the first agent indicating that the first virtual machine is unavailable includes instructions which, when executed, cause the processor to at least:
   transmit a test message from an application monitor to the first agent, the test message including first content;
   receive, at the application monitor, the first response from the first agent including second content when the first agent receives the test message;
   compare, at the application monitor, the second content to third content, the third content corresponding to expected content; and
   determine, at the application monitor, that the first virtual machine is unavailable when the second content does not match the third content.

24. The apparatus of claim 12, wherein the availability enhancer is to determine that the first response from the first agent indicating that the first virtual machine is unavailable by:
   transmitting a test message to the first agent, the test message including first content;
   receiving the first response from the first agent including second content when the first agent receives the test message;
   comparing the second content to third content, the third content corresponding to expected content; and
   determining that the first virtual machine is unavailable when the second content does not match the third content.

* * * * *